Patented Aug. 13, 1940

2,211,419

UNITED STATES PATENT OFFICE 2,211,419

ESTER CONDENSATION

Virgil L. Hansley, Niagara Falls, N. Y., assignor to E. I. du Pont de Nemours & Company, Wilmington, Del., a corporation of Delaware No Drawing. Application March 4, 1939, Serial No. 259,797

2 Claims. (Cl. 260—345)

This invention relates to the preparation of condensation products of organic compounds and more particularly to condensations of esters, or of esters with ketones or aromatic aldehydes.

This is a continuation-in-part of my copending application S. N. 87,257, filed June 25, 1936, since issued as U. S. Patent 2,158,071.

Condensations of the above type, generally referred to as "Claisen condensations," have long been known. Various condensing agents have been used in effecting such condensations. Among the more common of these are metallic sodium and sodium alcoholate although sodamide, alkali metals other than sodium and their alcoholates, as well as alkali earth metals and alcoholates of alkali earth metals likewise have been used in certain instances.

Condensation reactions of the above type in general have been unimportant except from a laboratory standpoint since the yields obtainable are relatively low when condensations are carried out by means of the usual condensing agents. This is generally due to the occurrence of side reactions when an alkali metal or alkali earth metal is the condensing agent, or to the formation of by product alcohol when an alcoholate is employed.

An object of the present invention is to provide an improved condensing agent for use in condensation reactions involving esters and aromatic aldehydes. Another object is to provide a condensing agent that does not effect reduction of the reactants or reaction products during such condensation reactions. A further object is a method for carrying out condensations of esters and aromatic aldehydes whereby good yields of condensation products are obtainable. Other objects will be hereinafter apparent.

These objects are accomplished in accordance with the present invention by employing a metal hydride of an alkali or alkaline earth metal as the active condensing agent. I have found that such hydrides are highly effective condensing agents in the above type of reactions in that condensations may be effected with high yields of the desired condensation products, which yields are unobtainable when the previously known condensing agents are employed.

The alkali metal hydrides are especially well suited for the present use, although hydrides of the alkaline earth metals likewise may be advantageously employed. For reasons which will be hereinafter apparent I prefer to practice my invention using sodium hydride, preferably in a finely divided state, as the active condensing agent.

Sodium hydride of suitable form and purity may be conveniently prepared according to the method described in U. S. Patent 1,958,012. The hydride obtained by this method is finely divided and has a purity of 99-100%. It is best handled as a powder moistened with the inert hydrocarbon in which it has been prepared. When finely divided sodium hydride is covered with an inert hydrocarbon such as kerosene, it is practically inert to the atmosphere and may be handled without danger of spontaneously igniting.

Sodium hydride prepared by the method of the above patent possesses several advantages over sodium for use in the condensation reactions under consideration. Since these condensations generally require temperatures below the melting point of sodium, the latter is generally subdivided by heating in an inert solvent before it is used. Usually this requires a solvent different from that in which the reaction is to take place. On the other hand sodium hydride is finely divided as prepared and can be preserved indefinitely when wet with the inert organic medium in which it is prepared. In addition, sodium hydride possesses to a large measure all of the condensing powers of sodium itself but retains little or none of the reducing power of sodium towards carbonyl compounds such as aldehydes, ketones, and esters. The use of sodium hydride therefore gives higher yields of condensation products since by-products due to reduction of the reactants or reaction products are eliminated. Furthermore, condensation reactions effected by the use of sodium hydride appear to be more direct than those effected with sodium since during a condensation with sodium the reaction mixture is deeply colored, whereas when sodium hydride is used the reaction mixture remains white or at most only faintly colored throughout. Also, finely divided sodium hydride moistened with benzene or kerosene is less hazardous to handle, less hydroscopic, and more inert to constituents of the air than is metallic sodium in the same state of subdivision.

Sodium hydride is generally better adapted for carrying out these condensations than is sodium alcoholate. Sodium hydride is essentially an alcoholate in its reactions except that no alcohol is formed as a by-product from the hydride. Since many of these reactions are equilibrium reactions with alcohol being a reaction product, sodium hydride is particularly useful since by its use a minimum amount of by-product alcohol is formed in the mixture. Another advantage of sodium hydride over sodium alcoholate is that in many cases the reaction mixtures are more fluid when the hydride is used than when an alcoholate is used.

Alkali and alkaline earth metal hydrides and especially sodium hydride may be used to carry out condensations of saturated esters with aromatic aldehydes. Condensations may be effected with saturated aliphatic or aromatic esters of low or high molecular weight, provided that one of the ester members has a carbon atom adjacent to the carbonyl radical, which carbon atom is essentially aliphatic in reaction and holds at least one hydrogen atom. Esters which may be used in accordance with the present invention include, among others, the saturated esters of low molecular weight acids, such as acetic, propionic and butyric acids, and the saturated esters of the higher molecular weight acids, such as capric, lauric, myristic, palmitic and stearic acids.

In practicing the present invention to effect condensations between esters and aromatic aldehydes, any aldehyde of aromatic character may be employed, for example, benzaldehyde, naphthaldehyde and furfuraldehyde. Likewise any saturated ester may be used as one of the condensing members provided the ester contains a carbon atom attached to the carbonyl group which is essentially aliphatic in reaction and which has attached thereto at least one hydrogen atom.

In practicing my invention, the amount of alkali or alkaline earth metal hydride employed may vary. When, for example, sodium hydride is employed one mole may be conveniently and effectively used for effecting a condensation to produce theoretically one mole of reaction product although in some instances it is advantageous to employ twice the above amounts. When the reaction is an equilibrium reaction with a mole of alcohol as a reaction product the use of two moles of metal hydride removes completely the by-product alcohol and thus effects a more complete reaction in the desired direction. In any case, the amount of hydride employed has but a slight effect on the final cost of the reaction product, especially when sodium hydride is used, since the molecular weight of the latter is relatively small.

The following examples illustrate a few of the numerous adaptations for which my invention may be used.

*Example I*

Benzaldehyde, 106 grams (1 mole), was added dropwise to a stirred suspension of 30.2 grams (1.26 moles) sodium hydride in 460 cc. (excess) of ethyl acetate cooled to 0° C. The time required for the reaction was 1.5 hours. The reaction mixture was then acidified with acetic acid and worked up in the usual manner. The yield of distilled ethyl cinnamate was 149 grams or 85% based upon the benzaldehyde used.

*Example II*

Benzaldehyde, 106 grams (1 mole), was added slowly to a suspension of sodium hydride, 28.8 grams (1.2 moles), in an excess of dry and essentially alcohol-free methyl acetate, which served as a reactant and solvent. The rate of reaction was controlled by the temperature, —10° C., and by the rate of addition of the aldehyde so that a slow but steady rate of hydrogen evolution was maintained. As soon as the calculated amount of hydrogen had been evolved the reaction mixture was acidified with acetic acid and methyl cinnamate isolated by distillation. 116 grams of a 72% yield of methyl cinnamate resulted. Along with this 46.5 grams of methyl acetoacetate was obtained (a 30% yield based on the sodium hydride used).

*Example III*

A suspension of sodium hydride in kerosene was made by adding 7.4 grams of sodium hydride to 250 cc. of kerosene. This was heated to 85° C. and during a period of one hour, a mixture of 72.2 grams of linseed oil and 24 grams of furfural was added to the kerosene-sodium hydride suspension. The temperature during this time was maintained at 85–100° C. The reaction mixture then was permitted to cool to 65° C. and was then acidified by adding 0.5 mole of glacial acetic acid and 200 cc. of water. The kerosene solution then was washed with water until free from acid and distilled to recover the product of the condensation reaction, which boiled at 210–220° C. A yield of 67 grams of condensation product was obtained which had a saponification number of 163 and an acid number of 97.2.

*Example IV*

The procedure of Example III was followed to condense furfural with methyl esters of menhaden oil. A mixture of 164 grams of the methyl esters of menhaden oil and 48 grams of furfural was slowly added to a suspension of 15 grams of sodium hydride in 250 cc. of kerosene. The reaction temperature was maintained at 75–105° C. Approximately one hour was required for adding the reactants and the reaction mixture then was stirred at about 90° C. for one hour. After acidifying, washing and distilling, as in Example III, a product was obtained boiling at 245–250° C. at a pressure of 15 mm. of mercury. The saponification number was 155.5 and the acid number was 4.6.

*Example V*

The method of Example III was used to react furfural with methyl esters of soya bean oil. A mixture of 140 grams of the ester and 48 grams of furfural was added to a kerosene suspension of 15 grams sodium hydride in 250 cc. of kerosene at a temperature of 80–100° C. The product was recovered by acidifying with acetic acid, washed with water and distilled as in Example III. The product had a saponification number of 153 and an acid number of 102.

*Example VI*

Furfural was reacted with ethyl propionate in the presence of sodium hydride, utilizing the ethyl propionate as the reaction solvent. The ethyl propionate was cooled to 0° C. and 44.5 grams of sodium hydride was suspended in 400 cc. of the propionate. Furfural was then slowly added to the suspension while the temperature was maintained at 14–15° C. One hour was required for adding the furfural and the reaction mixture was maintained for about one hour longer at a temperature of 14–15° C. The reaction mixture then was acidified with acetic acid and washed with water. The ester layer was separated, dried and then distilled in vacuo to remove unreacted ester. A 70% yield of beta-furyl methacrylate was obtained.

*Example VII*

A suspension of sodium hydride was made by adding 30 grams of sodium hydride to 210 grams of ethyl acetate. The suspension was cooled to —10° C. and furfural was slowly added thereto until 96 grams of furfural had been added. The reaction temperature during this time was maintained at —10 to —5° C. The reaction mixture then was acidified with a mixture of HCl gas and anhydrous methanol. The mixture then was filtered and the residue washed with ethyl acetate and the resulting ethyl acetate solution was distilled. A yield of 77 grams (46.4% yield) of ethyl furylacrylate was obtained.

In practicing the present invention, the ester employed as one of the reaction constituents may be conveniently used as the solvent medium for the reaction. However, other solvents which do not react with the reactants or reaction products or with the metal hydride condensing agent may be employed. For example, among other xylene, kerosene, ethers and inert hydrocarbons in general may be advantageously used, especially when the ester reaction constituent is a solid and when the reaction temperature required is relatively high. When the ester reaction constituent has a high boiling point and is difficult to distill, the use of an inert solvent in place of an excess of the ester to act as the reaction solvent obviates the necessity of separating the excess ester by distillation from the reaction mixture.

While I have illustrated in the above examples condensations of aromatic aldehydes with esters, effected at temperatures ranging from —10 to over 100° C., it is to be understood that the above temperature ranges are merely illustrative and are not intended to limit the scope of my invention. The reaction temperature to be employed will depend in each case upon the reactants used and the condensation desired. In general, a higher reaction temperature is required as the molecular weight of the ester employed is increased.

I prefer to use sodium hydride as condensing agent in practicing my invention because it is relatively cheap and more conveniently prepared in a suitable state than are other alkali or alkaline earth metal hydrides. Furthermore, I prefer to employ an alkali metal hydride rather than an alkaline earth metal hydride because the alkali metal hydrides may be prepared conveniently at relatively low temperatures in a finely divided state. However, alkaline earth hydrides, such as calcium hydride, may be used effectively as condensing agents in my process.

Many of the compounds which may be prepared in accordance with the present invention have long been important in laboratory syntheses but because of their relatively high cost have found little, if any, use in commercial chemical processes. These compounds may be prepared relatively cheaply and in good yields by use of the present condensing agents which makes possible an extension of their present uses to commercial fields. For example, the present invention is advantageous for producing alkyl esters of cinnamic acid, as illustrated by Examples I and II. It also provides a new and improved method for producing various condensation products of furfuraldehyde, which have varied uses in the technology of organic chemistry. For example, furfuraldehyde may be reacted with various alkyl esters of the lower fatty acids, for example, the methyl, ethyl and propyl esters of acetic, propionic and butyric acids, to produce various furylacrylates. Thus, with methyl and ethyl acetates, the methyl and ethyl esters, respectively, of furylacrylic acid are obtained; this is illustrated by Example VII. By employing esters of fatty acids having three or more carbon atoms per acid group, alkyl derivatives of the furylacrylates are produced; for example, as shown in Example VI, condensation of furfuraldehyde with an alkyl ester of propionic acid produces the alkyl ester of beta-furyl methacrylic acid.

It is understood that the present invention is not limited by the modifications and examples herein disclosed and that any adaptation or modification apparent to a skilled chemist is intended to come within the scope and spirit of the invention.

I claim:

1. A process for preparing ester condensation products comprising reacting a saturated ester with furfuraldehyde in the presence of sodium hydride, said ester having a carbon atom adjacent to the carbonyl group which is essentially aliphatic in reaction and which has attached thereto at least one hydrogen atom.

2. A process for preparing an alkyl furylacrylate which comprises reacting furfuraldehyde with an alkyl acetate in the presence of an alkali metal hydride.

VIRGIL L. HANSLEY.